(12) United States Patent
Willoughby et al.

(10) Patent No.: US 9,724,600 B2
(45) Date of Patent: Aug. 8, 2017

(54) CONTROLLING OBJECTS IN A VIRTUAL ENVIRONMENT

(75) Inventors: Christopher Harley Willoughby, Kenmore, WA (US); Jeffrey Jesus Evertt, Kirkland, WA (US); Justin Avram Clark, Kirkland, WA (US); Ben John Hindle, Bellevue, WA (US); Peter Glenn Sarrett, Redmond, WA (US); Joel Deaguero, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 110 days.

(21) Appl. No.: 13/281,596

(22) Filed: Oct. 26, 2011

(65) Prior Publication Data

US 2012/0306924 A1 Dec. 6, 2012

Related U.S. Application Data

(60) Provisional application No. 61/493,787, filed on Jun. 6, 2011.

(51) Int. Cl.
G06F 1/10 (2006.01)
A63F 13/40 (2014.01)

(52) U.S. Cl.
CPC ...... *A63F 13/10* (2013.01); *A63F 2300/1087* (2013.01); *A63F 2300/6045* (2013.01); *A63F 2300/6607* (2013.01); *A63F 2300/69* (2013.01)

(58) Field of Classification Search
CPC ......... G06T 1/10; G06F 1/10; G06K 2007/00; G01V 2200/00

(Continued)

(56) References Cited

U.S. PATENT DOCUMENTS

| 4,627,620 A | 12/1986 | Yang |
| 4,630,910 A | 12/1986 | Ross et al. |

(Continued)

FOREIGN PATENT DOCUMENTS

| CN | 1764931 A | 4/2006 |
| CN | 101515374 A | 8/2009 |

(Continued)

OTHER PUBLICATIONS

Ferro, Mike, "Microsoft's Tsunoda Promises Object-scanning Feature for Kinect Later on", Sep. 8, 2010, Available at: http://gamer.blorge.com/2010/09/08/microsofts-tsunoda-promises-object-scanning-feature-for-kinect-later-on/.

(Continued)

*Primary Examiner* — Peter Hoang
(74) *Attorney, Agent, or Firm* — Shook Hardy & Bacon LLP

(57) ABSTRACT

Methods, systems, and computer-storage media having computer-usable instructions embodied thereon, for controlling objects in a virtual environment are provided. Real-world objects may be received into a virtual environment. The real-world objects may be any non-human object. An object skeleton may be identified and mapped to the object. A user skeleton of the real-world user may also be identified and mapped to the object skeleton. By mapping the user skeleton to the object skeleton, movements of the user control the movements of the object in the virtual environment.

20 Claims, 19 Drawing Sheets

(58) Field of Classification Search
USPC ......... 715/862, 757; 382/103, 128; 345/158; 353/7
See application file for complete search history.

(56) References Cited

U.S. PATENT DOCUMENTS

| | | | |
|---|---|---|---|
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A * | 10/2000 | Kunz | 345/630 |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,317,130 B1 * | 11/2001 | Ishikawa | G06T 13/40 345/473 |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 * | 11/2008 | Kuraishi | 463/30 |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |

(56) References Cited

U.S. PATENT DOCUMENTS

| | | | |
|---|---|---|---|
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2004/0155962 | A1 | 8/2004 | Marks |
| 2004/0239670 | A1 | 12/2004 | Marks |
| 2006/0274068 | A1 | 12/2006 | Barthelet |
| 2007/0211067 | A1* | 9/2007 | Hunter .......................... 345/581 |
| 2008/0026838 | A1 | 1/2008 | Dunstan et al. |
| 2008/0062169 | A1* | 3/2008 | Heesemans et al. ......... 345/420 |
| 2008/0312770 | A1* | 12/2008 | Alvarez et al. ............... 700/251 |
| 2009/0279784 | A1 | 11/2009 | Arcas et al. |
| 2010/0001993 | A1 | 1/2010 | Finn et al. |
| 2010/0177968 | A1 | 7/2010 | Fry et al. |
| 2010/0302247 | A1* | 12/2010 | Perez et al. ................... 345/440 |
| 2010/0302253 | A1* | 12/2010 | Kipman et al. ............... 345/473 |
| 2011/0066383 | A1 | 3/2011 | Jangle et al. |
| 2011/0069866 | A1* | 3/2011 | Kim et al. ..................... 382/103 |
| 2011/0098092 | A1 | 4/2011 | Reiche, III |
| 2011/0112404 | A1 | 5/2011 | Gourevitch |

FOREIGN PATENT DOCUMENTS

| | | |
|---|---|---|
| CN | 101579238 A | 11/2009 |
| CN | 101254344 B | 6/2010 |
| EP | 0583061 A2 | 2/1994 |
| EP | 0804032 A2 | 10/1997 |
| JP | 08044490 A1 | 2/1996 |
| JP | 2001043400 A | 2/2001 |
| JP | 2008033521 A | 2/2008 |
| WO | 93/10708 A1 | 6/1993 |
| WO | 97/17598 A1 | 5/1997 |
| WO | 99/44698 A1 | 9/1999 |
| WO | 03-082413 A1 | 10/2003 |

OTHER PUBLICATIONS

Bailenson, et al., "Virtual Interpersonal Touch: Haptic Interaction and Copresence in Collaborative Virtual Environments", In Journal of Multimedia Tools and Applications, vol. 37, Issue 1, Mar. 2008, pp. 25.

Kanade et al., "A Stereo Machine for Video-rate Dense Depth Mapping and its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

PCT International Search Report dated Dec. 28, 2012 regarding PCT/US2012/040796 7 pages.

EPC Search Report mailed Apr. 10, 2014, regarding European Patent Appln. No. 12796689.3 3 pages.

(56) References Cited

OTHER PUBLICATIONS

"E3 2011: Kinect Fun Labs" published Jun. 5, 2011, retrieved Apr. 1, 2010 from the Internet: URL:http://www.youtube.com/watch?v=gRKnWyLYJjI; time marker: 1:33/2:23-1:43/2:23.
Office Action received for European Patent Application No. 12796689.3 mailed Jun. 5, 2014, filed Jun. 4, 2012, 5 pages.
"Office Action Issued in European Patent Application No. 12796689.3", Mailed Date: Aug. 8, 2014, 4 Pages.
"First Office Action and Search Report Issued in Chinese Patent Application No. 201280027665.0", Mailed Date: Jun. 25, 2015, 12 Pages.
Yamanaka, Osamu, "Softimage 3D De Taisaku-Animation 0 Tsukurou! (Let's Make a Great Animation by Using Softimage 3D!)", vol. 6, Issue 1, Jan. 10, 1998, pp. 122-127.

* cited by examiner

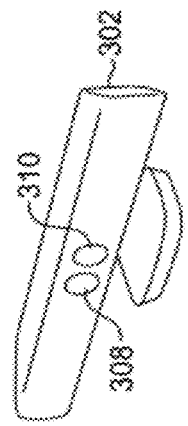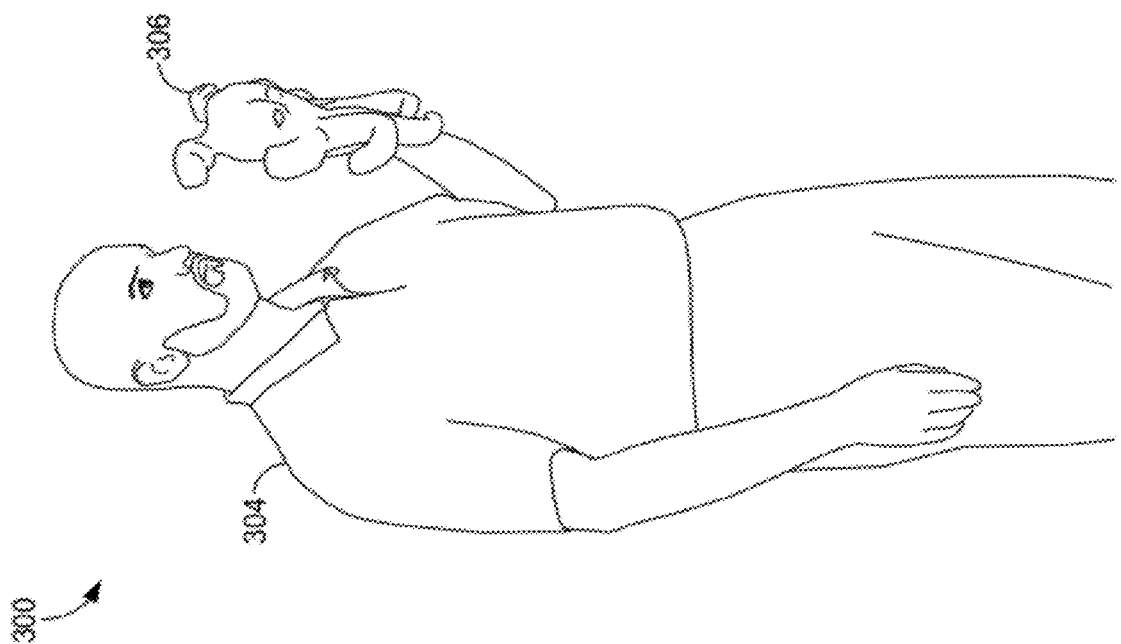
FIG. 3

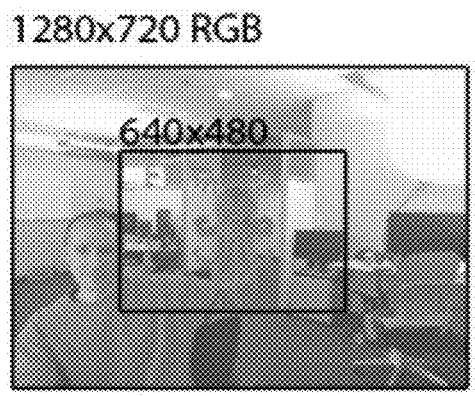 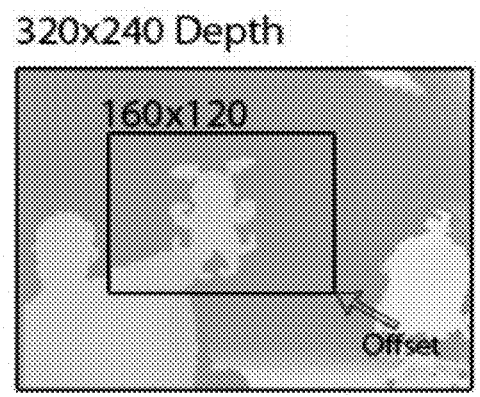
FIG. 5A          FIG. 5B
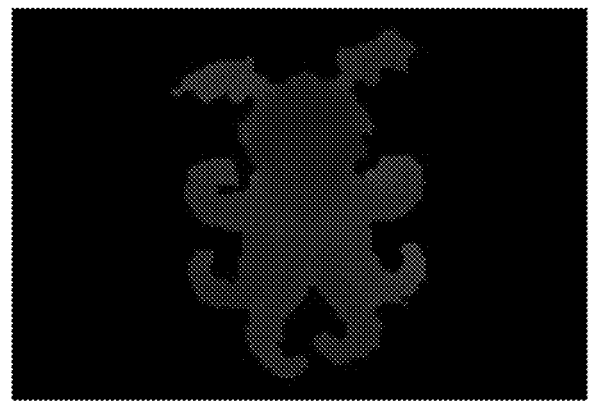
FIG. 6
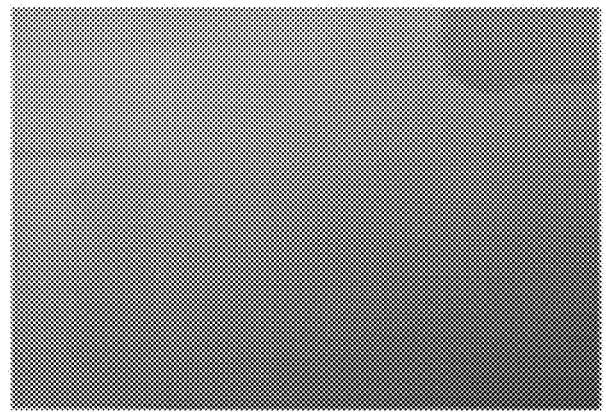
FIG. 7

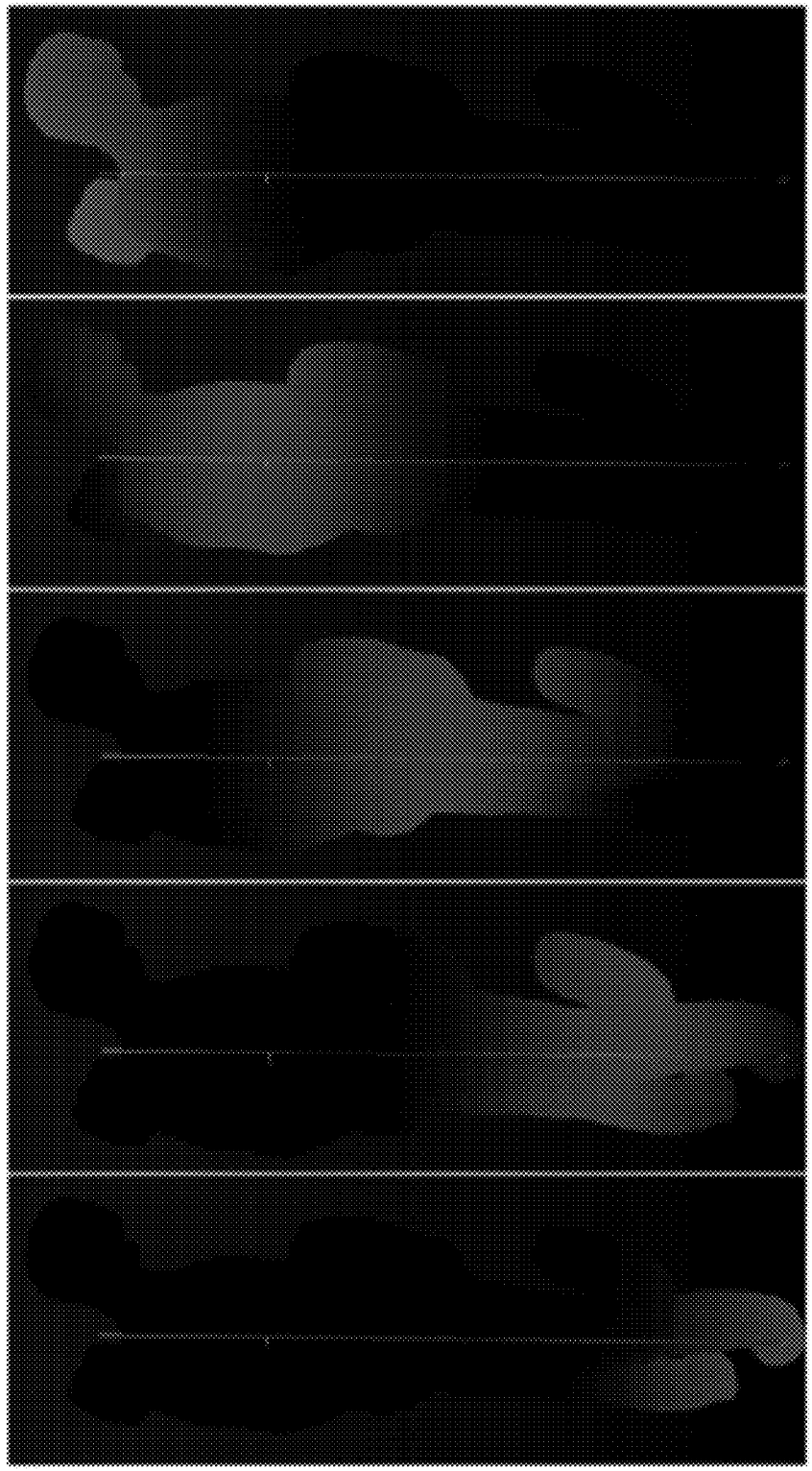

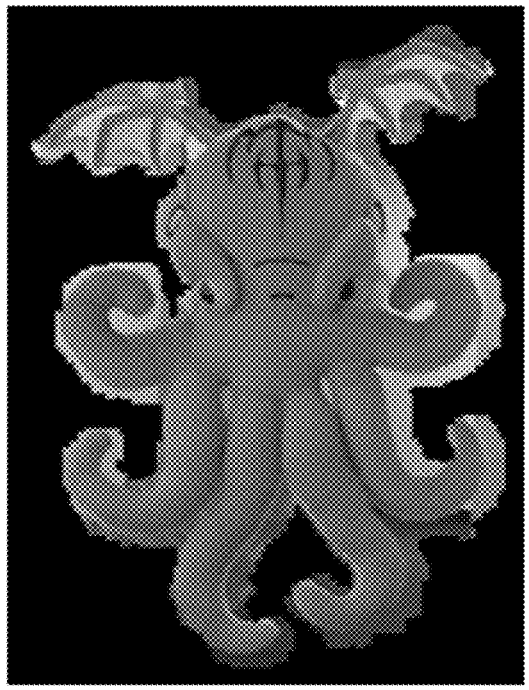 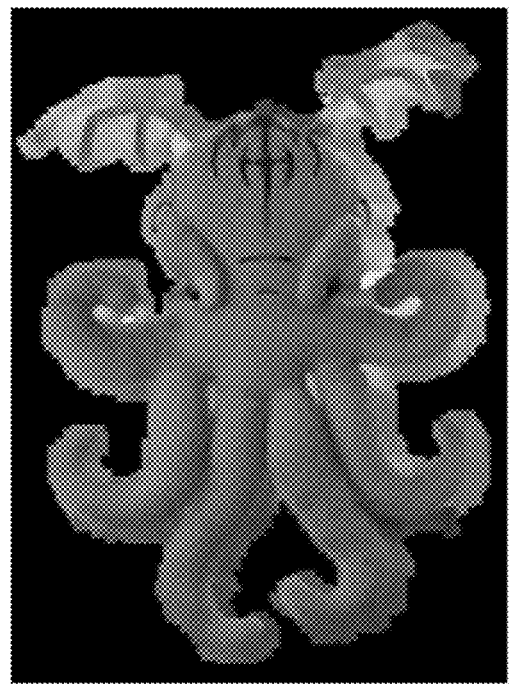
FIG. 21A  FIG. 21B
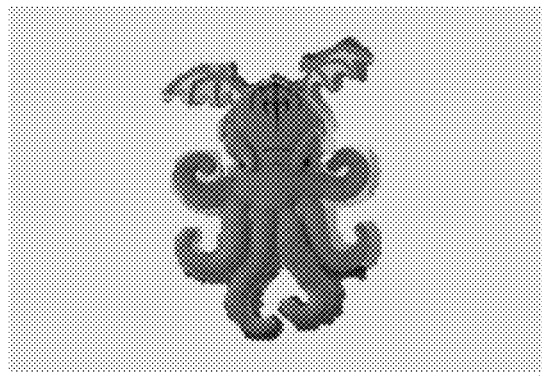 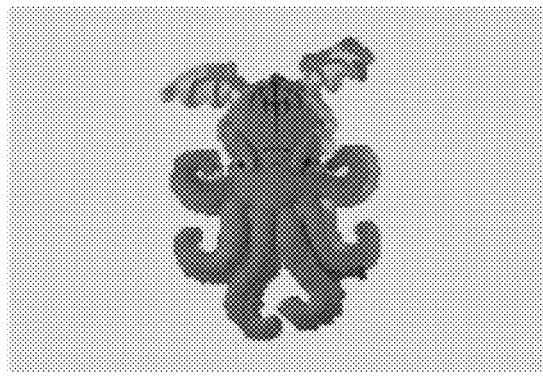
FIG. 22A  FIG. 22B

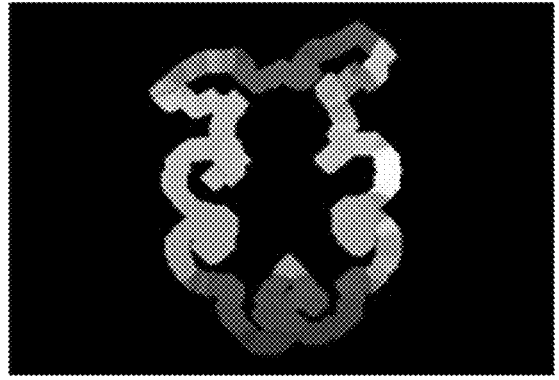 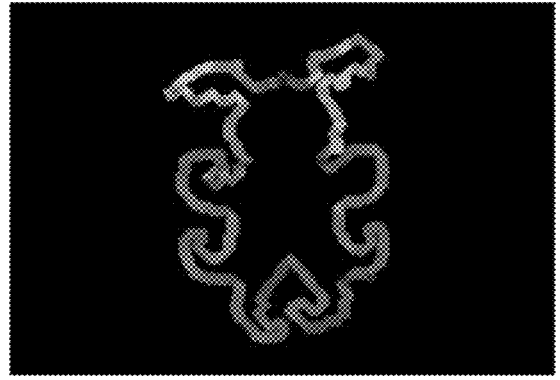
FIG. 23A          FIG. 23B
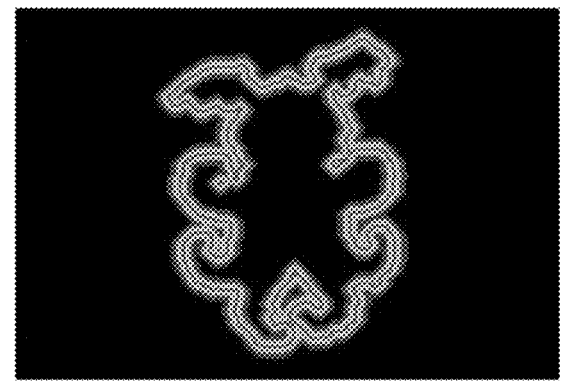 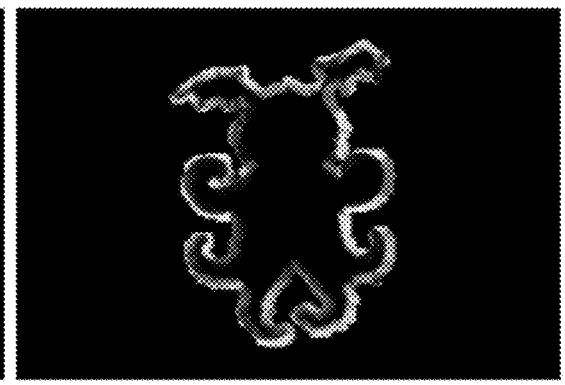
FIG. 24A          FIG. 24B

CONTROLLING OBJECTS IN A VIRTUAL ENVIRONMENT

CROSS-REFERENCE TO RELATED APPLICATIONS

This application claims priority to U.S. Provisional Patent Application No. 61/493,787 filed Jun. 6, 2011 the disclosure of which is hereby incorporated herein by reference in its entirety.

BACKGROUND

Virtual environments have made significant advances in recent years. With those advances come increasing demands from users to increase interactions with the virtual environment. Real-time control of pre-determined models using web-cam based head tracking is currently available in some video chat applications and allows a user to control a virtual avatar head by tracking the position of the user's head and using the user's voice to control the mouth of the avatar. In this case though, the avatar is pre-determined, tracking is limited to the head, and a simple one-to-one mapping between the user's head orientation and the avatar's head orientation is used. There is currently not a model that allows a user to fully control an object that has been received from the real-world and digitized into a virtual object. In other words, an object that is not pre-determined. Further, utilizing skeletal tracking information of a user to control the entire virtual object (e.g., limbs, the head, etc.) using the user's body is not available.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to systems, methods, and computer storage media for, among other things, controlling an object in a virtual environment. Real-world objects may be digitized, as described in detail hereinafter, and received by, for example, a gaming system. In an embodiment, the real-world object are non-human objects such as inanimate objects (e.g., chairs, balls, stuffed animals, etc.), pets (e.g., cats), and the like. Once a digitized object is received, various skeletal mappings, of the object and the human user, may be performed such that the object is controlled by the user. In other words, a user's movements may control movements of the object in the virtual environment.

BRIEF DESCRIPTION OF THE DRAWINGS

The present invention is described in detail below with reference to the attached drawing figures, wherein:

FIG. 3 is a diagram of a user presenting an object for digitization, in accordance with an embodiment of the present invention;

FIGS. 5A and 5B are diagrams of camera-view perspectives of a user presenting an object for digitization, in accordance with an embodiment of the present invention;

FIG. 6 is a diagram of a segmented depth image usable to digitize an object, in accordance with an embodiment of the present invention;

FIG. 7 is a diagram of depth-to-color offsets, in accordance with an embodiment of the present invention;

FIGS. 20A-20E is a diagram of diagrams illustrating weighting added to the different bones of a generated skeletal structure, in accordance with an embodiment of the present invention;

FIGS. 21A and 21B is a diagram of diagrams of images before and after luma/chroma processing, in accordance with an embodiment of the present invention;

FIGS. 22A and 22B is a diagram of diagrams of source and output images after edges are filtered, in accordance with an embodiment of the present invention;

FIGS. 23A and 23B is a diagram of diagrams of images where the edge repair filter finds background colors and which and target colors, in accordance with an embodiment of the present invention;

FIGS. 24A and 24B is a diagram of images showing distance from an edge to a disputed region and calculated background likelihood values, in accordance with an embodiment of the present invention;

DETAILED DESCRIPTION

Figure 1:
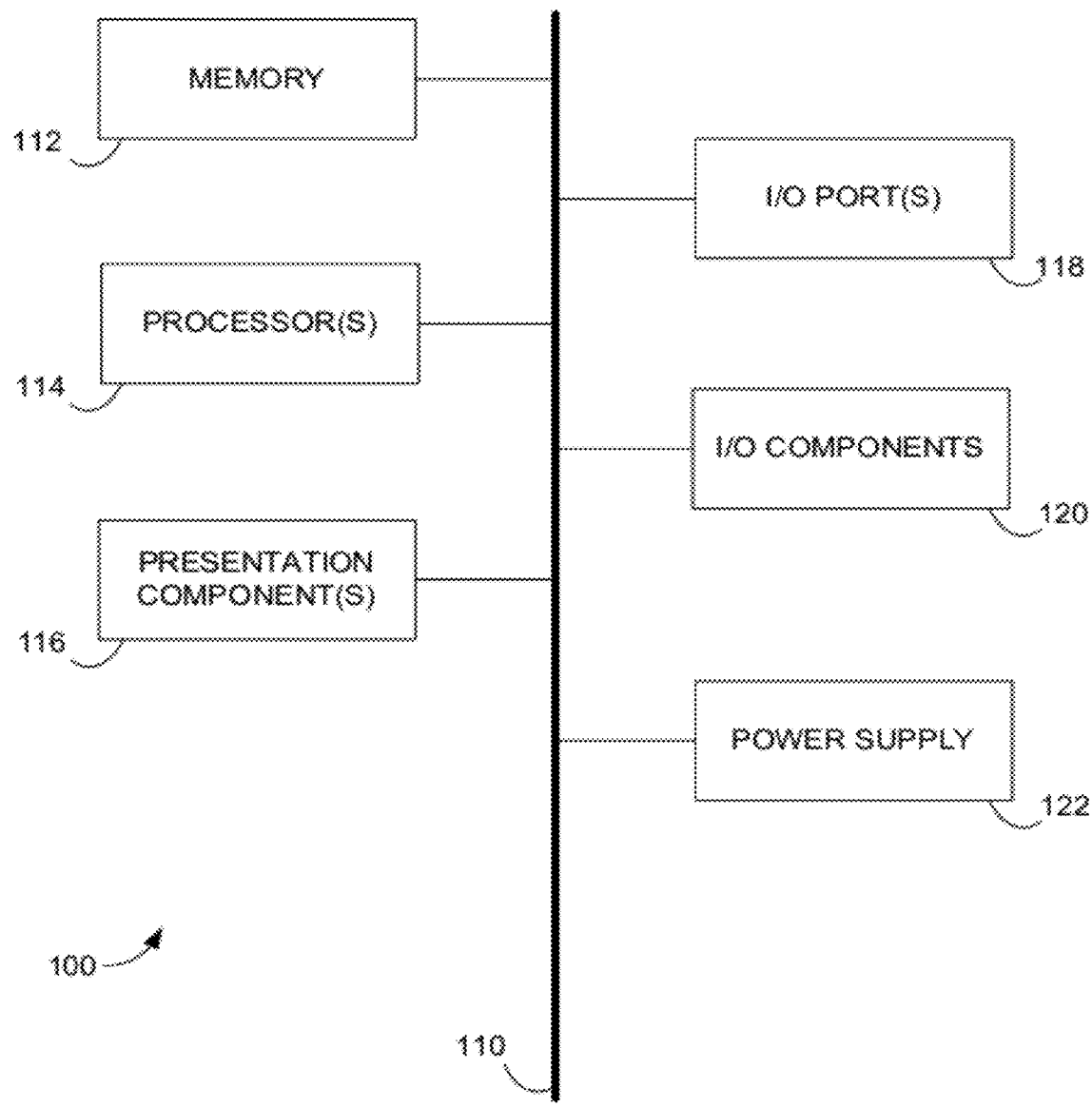
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to systems, methods, and computer storage media for, among other things, controlling an object in a virtual environment. Real-world objects may be digitized, as described in detail hereinafter, and received by, for example, a gaming system. In an embodiment, the real-world object are non-human objects such as inanimate objects (e.g., chairs, balls, stuffed animals, etc.), pets (e.g., cats), and the like. Once a digitized object is received, various skeletal mappings, of the object and the user, may be performed such that the object is controlled by the user. In other words, a user's movements may control movements of the object in the virtual environment.

Accordingly, one embodiment of the present invention is directed to one or more computer-storage media storing computer-useable instructions that, when used by one or more computing devices, cause the computing device to perform a method for controlling an object in a virtual environment. The method comprises identifying an object in a virtual environment. The object may be any non-human object. An object skeleton is mapped to the object. The object skeleton may be a pre-defined template and the object and/or the object skeleton may be adjusted to fit one another. A user skeleton is received and is mapped to the object skeleton. The user skeleton is an image of the skeleton of the user. Once the user skeleton is mapped to the object skeleton, the object is controlled by the user. In particular, the user's movements control the movements of the object in the virtual environment.

Another embodiment of the present invention is directed to a system comprising a processor and a memory for controlling objects in a virtual environment. The system comprises a computing device associated with one or more processors and one or more computer-readable storage media, a data store coupled with the computing device, and a controlling engine that identifies one or more skeletons including a user skeleton and an object skeleton, maps the user skeleton to the object skeleton, and manages the object skeleton such that an object is manipulated to mirror movements of the user skeleton.

Yet another embodiment of the present invention is directed to one or more computer-storage media storing computer-useable instructions that, when used by one or more computing devices, cause the computing device to perform a method for controlling an object in a virtual environment. The method comprises identifying an object in a virtual environment. The object is a real-world object that has been digitized into a virtual form in a virtual environment. An object skeleton is mapped to the object by identifying a center of mass of the object and imposing a center of the object skeleton onto the center of mass of the object. The object is resized to correspond to the size of the object skeleton such that a bottom of the object skeleton is aligned with a bottom of the object. A user skeleton is then received and is mapped to the object skeleton such that one or more joint angles of the object skeleton mirror one or more joint angles of the user skeleton. A movement of the user is identified and, in response to identifying the movement of the user, moving the object such that the object's movements mirror the movement of the user.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
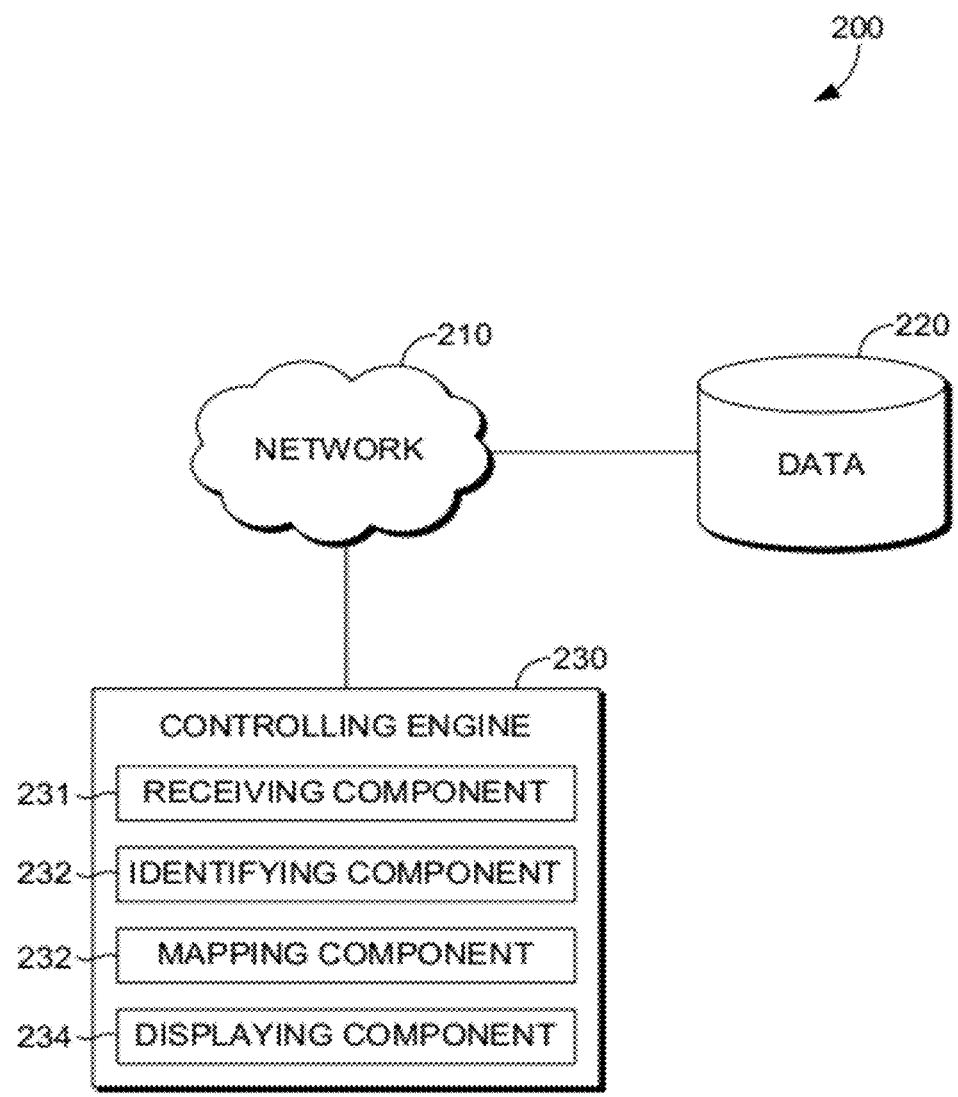
FIG. 2 is a block diagram that illustrates an environment for controlling objects in a virtual environment, in accordance with an embodiment of the present invention.

As indicated previously, embodiments of the present invention are directed to controlling an object in a virtual environment. Turning now to FIG. 2, a block diagram is provided illustrating an exemplary computing system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the computing system 200 generally includes a network 210, a data store 220, and a controlling engine 230. The controlling engine 230 may take the form of a dedicated device for performing the functions described below, may be integrated into, e.g., a network access device, a gaming system, or the like, or any combination thereof. The components of the computing system 200 may communicate with each other via the network 210, which may include, without limitation, one or more local area networks (LANs) and/or wide area networks (WANs). Such networking environments are commonplace in offices, enterprise-wide computer networks, intranets and the Internet. It should be understood that any number of computing devices and controlling engines may be employed in the computing system 200 within the scope of embodiments of the present invention. Each may comprise a single device/interface or multiple devices/interfaces cooperating in a distributed environment. For instance, the controlling engine 230 may comprise multiple devices and/or modules arranged in a distributed environment that collectively provide the functionality of the controlling engine 230 described herein. Additionally, other components/modules not shown may also be included within the computing system 200.

In some embodiments, one or more of the illustrated components/modules may be implemented as stand-alone applications. In other embodiments, one or more of the illustrated components/modules may be implemented via the controlling engine 230, as an Internet-based service, or as a module inside a gaming system. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers or client computing devices. By way of example only, the controlling engine 230 might reside within a gaming system, a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Generally, the system 200 illustrates an environment in which objects in a virtual environment are controlled by a real-world user. As will be described in further detail below, embodiments of the present invention provide receiving digitized objects and mapping skeletons to the objects. Additional embodiments of the present invention provide for mapping a user skeleton to the objects such that the user controls the object in the virtual environment.

The controlling engine 230 is configured to manage objects in a virtual environment such that the objects may be controlled by a user. The objects in the virtual environment may be any non-human object such as a pet, a stuffed animal, a chair, and the like. The controlling engine 230 includes a receiving component 231, an identifying component 232, a mapping component 233, and a displaying component 234. Each of the components is configured to enable to the controlling engine 230 to facilitate a user controlling the object in the virtual environment.

The receiving component 231 may be configured to, among other things, receive an object that has been digitized. The object, in an embodiment, is a real-world object. In embodiments, objects are any non-human, real-world object. Digitization, as used herein, refers generally to a process of identifying a real-world object provided to the system 200 and processing the real-world object into a virtual object.

FIG. 3 is a diagram of an environment 300 for a user 304 to create a digital representation of an object 306, according to one embodiment. Specifically, environment 300 shows user 304 presenting the object 306, illustrated as octopus figurine, to a computing device 302, which is equipped with two cameras: color camera 308 and depth camera 310. In environment 300, computing device 302 is a game console, such as the Microsoft Kinect™ created by Microsoft Corporation®. The cameras on computing device 302 capture one or more images that include the object 306. Color camera 308 captures color data for images, and depth camera 310 captures depth data. In alternative embodiments, computing device 302 may only have one camera that captures both color and depth data.

While not shown, user 304 may present the backside of the object 306 to the computing device to capture an image of the backside that can be combined with a front side image and used to produce a 3D rendition of the object 306. Additional images of other views of the object may also be captured in order to generate a more complete 3D digitization.

Figure 4:
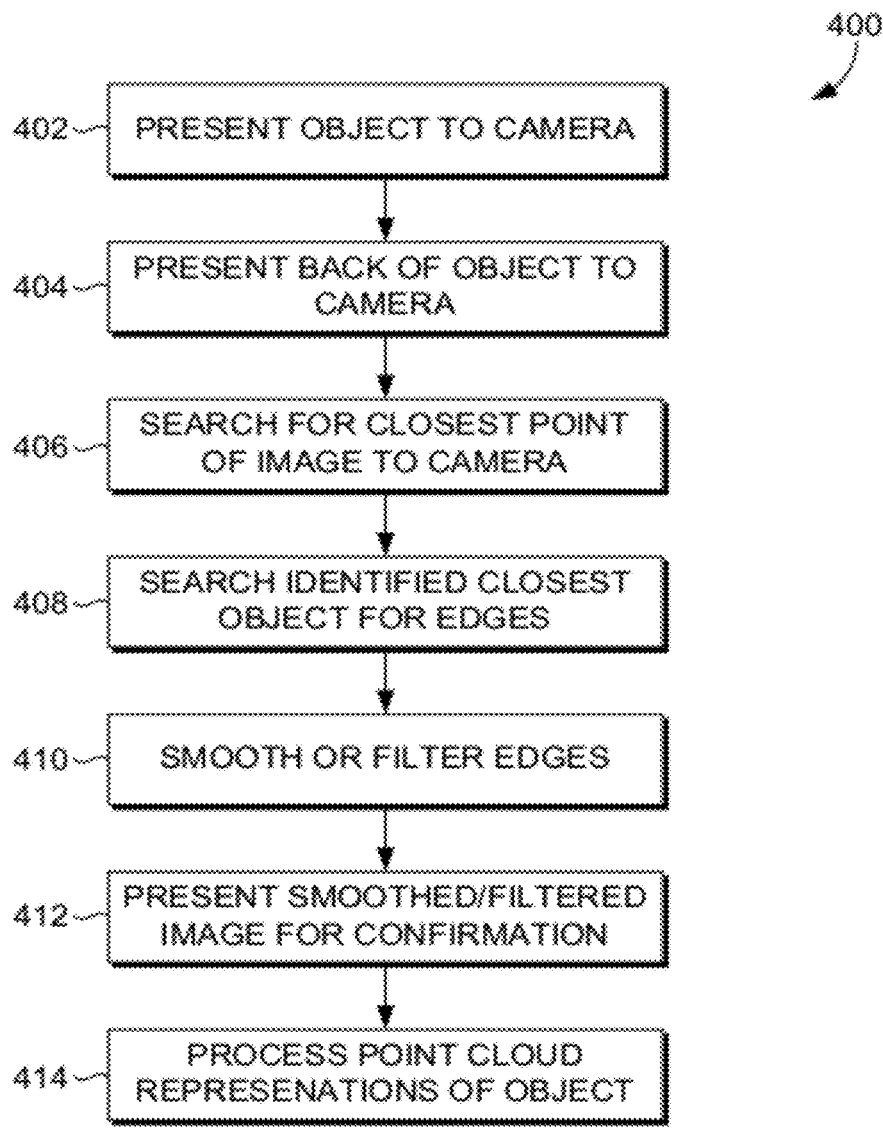
FIG. 4 is a diagram of a work flow for digitizing an object, in accordance with an embodiment of the present invention.

FIG. 4 is a diagram of a work flow 400 for digitizing an object, according to one embodiment. Initially, a user presents the object to a camera on a computing device to images taken, as shown at 402. The computing device may, in some embodiments, instruct the user to move the object into a specific area in order to capture an optimal image of the image—for example, providing an outline on a display, showing a real-time image of the user and the object, and then instructing the user to move the object into the outline. Once an initial image is taken, the computing device may instruct the user to present the backside of the object for capturing, as shown at 404. Guidance for capturing the backside may similarly be provided by the computing device. For each image captured, color and depth data are stored and used to digitize the object being presented. Moreover, multiple images may be captured for the front and backside perspectives of the object. For example, the computing device may be configured to take ten front images and ten back images, and possibly merge the front ten together and the back ten together—or use all twenty to digitize the image. While ten images have shown to be an ideal number of images to digitize an object, other embodiments may use different numbers of captured images.

Once front and back images of the object are captured by the camera, one embodiment begins digitizing the object by searching—using depth data of the images—for the closest point in the image to the camera, as shown at 406. The user is probably holding the object to be digitized in front of the user, so the object should be closer to the camera than anything else. Turning back to FIG. 3, one may notice that user 304 is holding the object 306 in front of him and thus closer to the computing device 302. Locating the closest object in the image may be accomplished using the depth data associated with the image, and some embodiments perform the process on both front and backside images to identify the closest object in both.

As indicated at 408, the closest objects identified in the images are then searched for edges to identify where the objects end. Depth data is again used to locate the edges of objects in the image. Edge searching may commence outwardly from the closest point, looking for drastic differences in the depths of points. For example, the edge of the octopus in FIG. 3 may have a point that is nearly half a meter closer than an adjacent point representing user 304's shoulder. Such a drastic difference represents a readable signal that the adjacent point is not part of the object and thus should not be included in further digitization steps. Locating all the edges of an object in such a manner allows the computing device to identify the object in the image.

Once the object is determined, one embodiment switches off the color data associated with the rest of the image (i.e., the portion of the image not identified as the object). It may be necessary in some embodiments to capture multiple images (e.g., ten images of the front and ten of the back of the object), so a smoothing technique may be required to blend the found edges between frames, as shown at 410. For example, the object may have moved between frame one and frame four so smoothing the edges between the frames may be necessary to get an accurate representation of the object. Additionally, noise, low resolution, and imperfections in depth-to-color registration may also necessitate additional smoothing and/or filtering of the edges.

In one embodiment, the resultant smoothed and/or filtered object is presented to the user for confirmation, as shown at 412. The user can then accept or reject the resultant object. If accepted, additional processing may then proceed to digitize the object. If rejected, embodiments may ask the user to begin the process over by taking new pictures of the object, or may simply re-smooth or re-filter the object.

Figure 12:
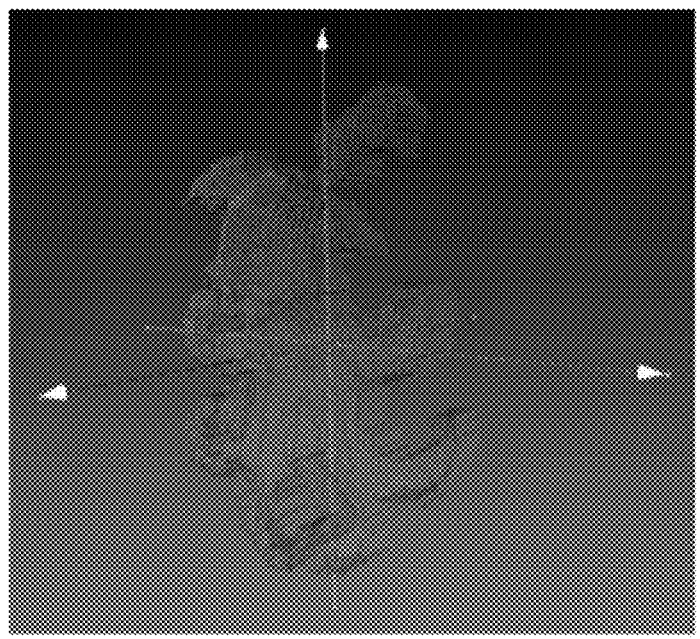
FIG. 12 is a diagram of a three-dimensional (3D) point cloud construction of an object, in accordance with an embodiment of the present invention.

Eventually, the front and back images are used to generate a point cloud construction of the object in 3D. A "point cloud construction," shown in detail in FIG. 12, is a mapping of the front and/or back images of the object into 3D space, with the depth of each point or pixel of the object identified. The point cloud construction is used in further digitization of the object.

FIGS. 5-27 show images of various steps in the digitization process and will be discussed in further detail below to illustrate the processing used by different embodiments. Specifically, FIGS. 5A and 5B are diagrams of camera-view perspectives of a user presenting an object for digitization, according to one embodiment. In the illustrated embodiment, two views of the object are captured. The color camera is zoomed in on the center of the frame to get a 640×480 color window around the target object, and the corners of the color window are then transformed into depth frame coordinates (assuming the corners are at the front of the target object). A matching 160×120 window is then grabbed from the depth frame. Without this per-frame window adjustment (dependent on the distance of the target object to the camera), the depth and color windows may not overlap as fully as possible. Moreover, raw color and depth are captured without performing depth-to-color or color-to-depth registration. The resolution numbers and windows are merely provided for illustrative purposes, as various other resolutions may alternatively be used.

In one embodiment, the depth image is segmented to the target object. To do so, the closest depth pixel to the camera is searched for and found, assuming that such a point is on the target object. This embodiment then flood-fills outwardly from found closest point until depth edges (i.e., where depth is too far from the front of the object or we have no depth data) are hit. Additionally, points around high slope areas and with too few neighbors may be removed. The result is a mask of depth pixels that are on the target object (referred to herein as a "segmented depth image"), as shown in FIG. 6. The segmented depth image is stored in a ring buffer of depth frames (BAB/GOE shipped with a ring buffer size of 10), overwriting the oldest depth frame and averaging all frames together to get a final depth image. In one embodiment, only segmented depth pixels contribute to the final average. As a result, noise is smoothed, resulting in a more stable object edge and improving scenarios where parts of the object are blinking in and out of the segmentation due to noise or poor IR reflecting materials.

FIG. 7 is a diagram of depth-to-color offsets, according to one embodiment. As illustrated, one embodiment builds a depth-to-color offset table with the green colors (shown in the uppermost, right corner) representing green points, red colors (shown in the lower left corner), and blending of the two in between. The offsets between each pixel's depth and color space coordinates are stored in a table for rapid lookup during color segmentation and mesh processing, as well as to aid perfectly reproducing output meshes using only the two captured color images, regardless of the calibration settings of a particular camera. Regions of the table outside the object segmentation may be filled in by copying offsets at the edge of the segmentation outwards. The copied offset at the edge may be used later to handle cases when vertices in the output mesh projected into the depth image fall outside the bounds of the depth segmentation.

Figure 8:
FIG. 8 is a diagram of a source color image usable to digitize an object, in accordance with an embodiment of the present invention.
Figure 9:
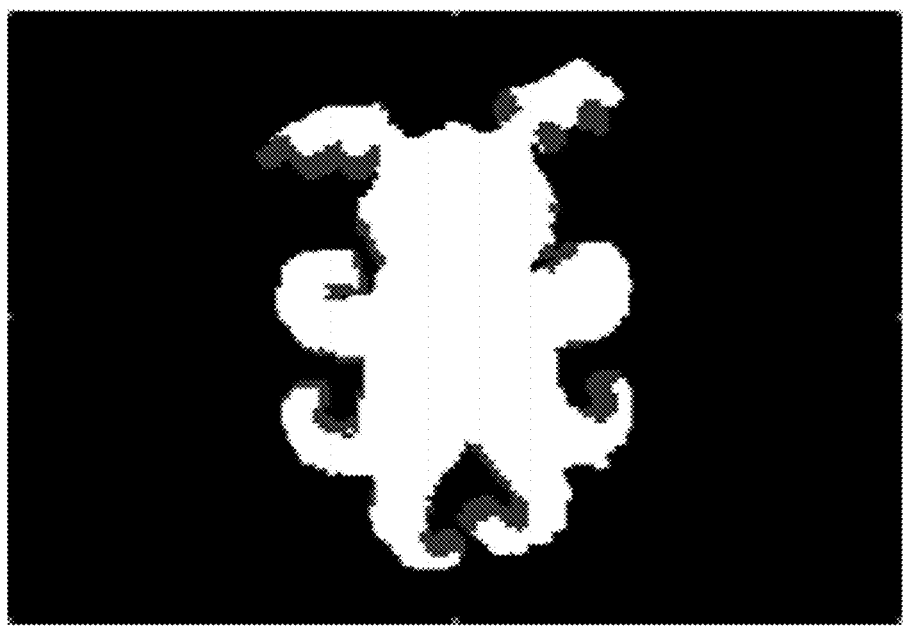
FIG. 9 is a diagram of a color segmentation of a captured object, in accordance with an embodiment of the present invention.

FIG. 8 is a diagram of a source color image, and FIG. 9 is a diagram of a color segmentation of a captured object, according to one embodiment. Starting with the segmentation in depth space, one embodiment splats each segmented depth pixel into a 320×240 color segmentation buffer, using a star-like splat pattern. The resultant pattern may then be "up-sampled" to 640×480, and a "distance-from-ideal" value, which describes how far the source depth pixel is from the "ideal" distance, is then computed for each segmented color pixel. The ideal distance represents how close to the camera the user should hold the target object in order to get as much color/depth data as possible—without intersecting the front clip plane of the depth camera. These values may be presented as feedback to the user during the capture process. Pixels further from ideal may be blurred and tinted more heavily than pixels closer to ideal. The distance-from-ideal values are eventually copied into the alpha channel of the color image used for real-time previewing.

Figure 10:
FIGS. 10 and 11 are diagrams of user interfaces (UIs) giving guidance for holding objects to be digitized, in accordance with an embodiment of the present invention.
Figure 11:
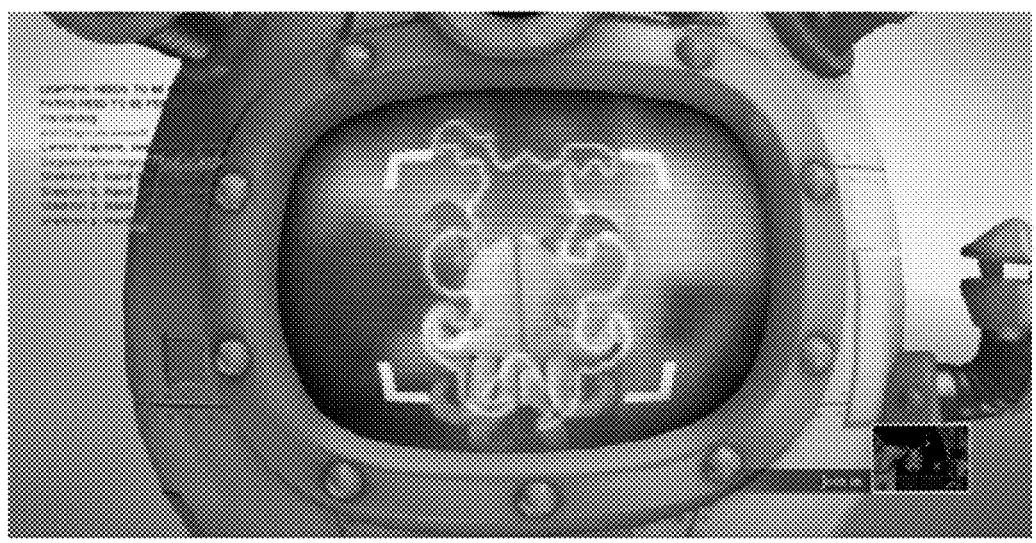

FIGS. 10 and 11 are diagrams of user interfaces (UIs) giving guidance for holding objects to be digitized, according to one embodiment. FIG. 10 shows that the illustrated embodiment analyzes the number of segmented pixels, distance to the camera, distance from the center of the camera view, pixel stability, and object size, and gives the user visual and text feedback on how to best position the object. The feedback may be in the form of an outline on a screen. FIG. 11 shows color and depth data of an image of the back of the target object, using the same process as above. One embodiment guides the user to orient the object correctly using the outline of the segmented front capture. The user may not have to match the outline precisely because front and back captures may later be aligned automatically.

FIG. 12 shows a point cloud construction, according to one embodiment. At this point two color and depth data images have been segmented to the target object. Using these images, a point cloud construction of points on the surface of the target object can be built and later used to reconstruct a triangle mesh. Segmented pixels in the front depth image are transformed into a "sheet" of 3D points. In one embodiment, positions are un-projected from depth image space into model space using depth data and the origin being the back-center of the sheet. The edges of the sheet are extruded backwards by adding additional points to form the sides of the object. To guess how "deep" the object is, in BAB/GOE, a fixed value for the extrude distance is used.

Figures 13A, 13B:
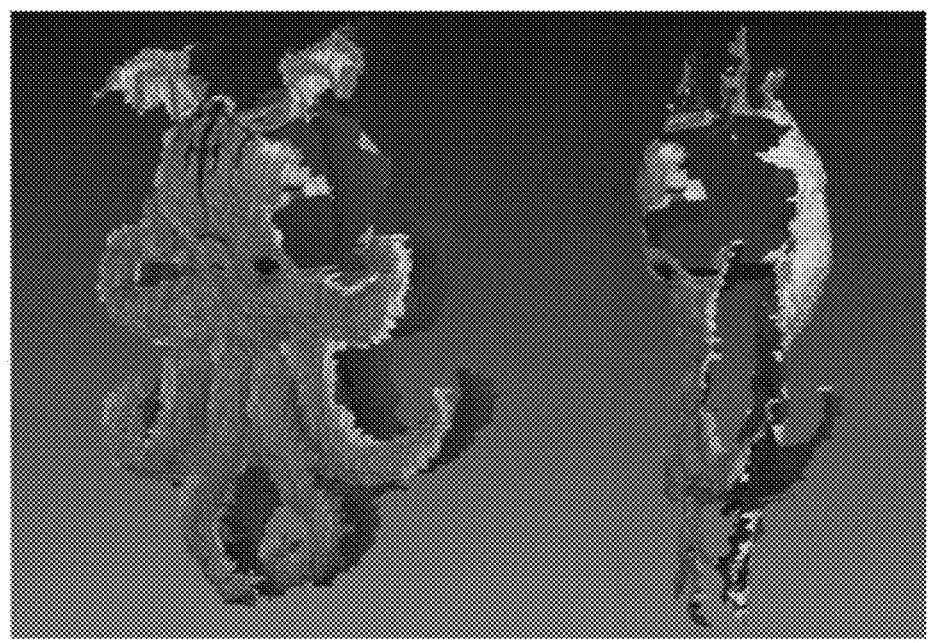
FIG. 13 is a diagram of two views of aligned point sheets, in accordance with an embodiment of the present invention.

Similarly, a sheet of 3D points from the back depth image is created, using the back-center of the front capture as the origin. FIG. 13 illustrates two views of aligned point sheets, according to one embodiment. To align the sheets, an initial transform is calculated to rotate this sheet 180 degrees around the up axis so that it forms the back of the point cloud. In one embodiment, another transform is calculated that aligns the edges of the front and back sheets as closely as possible. The alignment process may translate the back sheet to match the center of mass of the back sheet with center of mass of the front sheet. A brute-force iterate is then used over a range of translations and rotations to minimize an "alignment error" value, computed as the sum of the distances from each front edge point to its closest back edge point. The iterate may be done in multiple passes (with each pass attempting to compute the best value for each translation and rotation axis one at a time), and the search across each axis is done using a two-tier hierarchical approach for efficiency. Closest-point-finding is accelerated using a 3D cell space partition. One embodiment also implements an iterative closest point ("ICP") algorithm for fast fine-grained alignment, or alternatively, the need for better control may dictate use of only the brute-force method iterative.

Points from the front sheet that do not have corresponding points in the back sheet may be culled to search backwards from each front point to find the nearest back point. Likewise, points from the back sheet that do not have corresponding points in the front sheet may be culled. This removes parts of the sheet that are inconsistent between the front and back captures, as can happen if the user's hand is in the capture but has changed position between captures, or if the object has changed shape between front and back captures.

Figure 14:
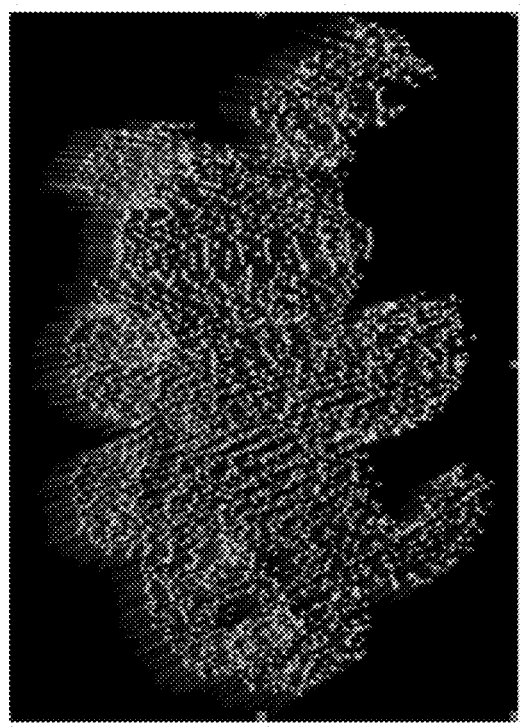
FIG. 14 is a diagram of a final point cloud construction, in accordance with an embodiment of the present invention.

In one embodiment, the remaining points are merged together into a final point cloud, and the normals for the points are computed using the plane formed by each point and its right and lower neighbors. FIG. 14 shows a final point cloud construction, according to one embodiment.

Figure 15:
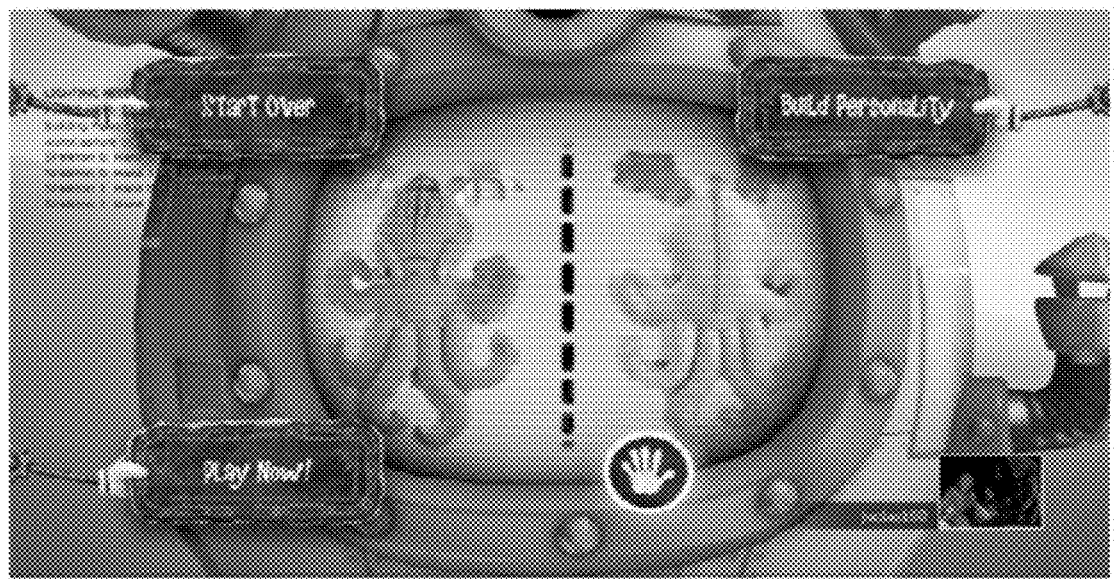
FIG. 15 is a diagram of a UI displaying a confirmation image of a digitized object displayed to a user, in accordance with an embodiment of the present invention.

A confirmation image may then be presented to the user, as shown in FIG. 15. The confirmation image incorporate the results of sheet alignment and point culling, allowing the user to detect cases when capture, alignment, or culling have failed badly and to re-capture without having to go through the remainder of the construction process. The image is created by projecting and splatting points in the final point cloud into the alpha channel of the front and back color images, rotating the back image based on the alignment transform, and doing some additional image cleanup.

Figure 16:
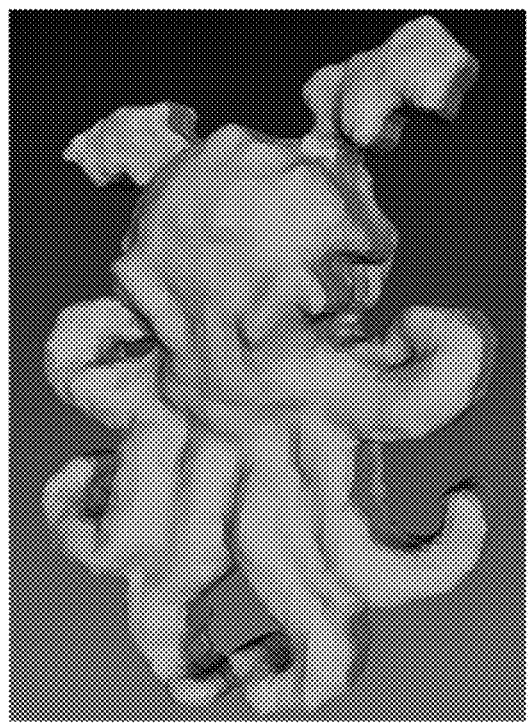
FIG. 16 is a diagram of a mesh output of a captured image, in accordance with an embodiment of the present invention.

A surface reconstruction step takes the final point cloud and generates a triangle mesh. FIG. 16 illustrates a diagram of a mesh output with surface reconstruction. This may be the most computationally intense part of digitization in both memory and time, taking, in some embodiments, 10-20 seconds for a typical point cloud data of approximately 20,000 points. The amount of hole-filling may be limited during reconstruction to keep memory usage under control, but such limiting can result in non-water-tight meshes if there are large holes in the point cloud.

Figure 17:
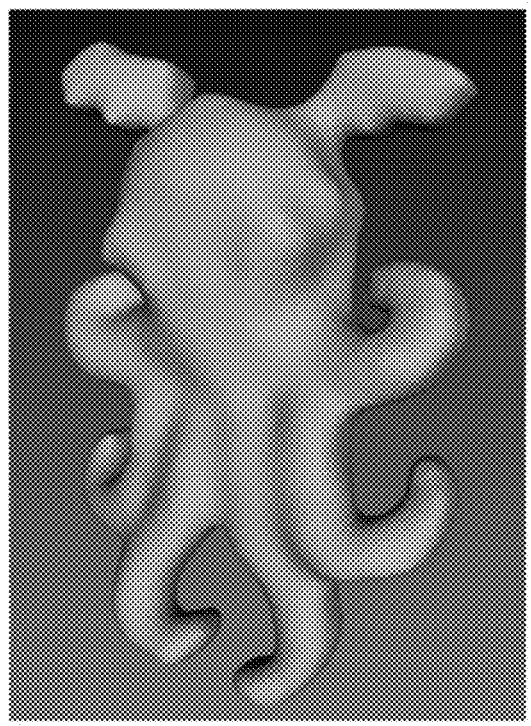
FIG. 17 is a diagram of a smoothed and processed image of an object, in accordance with an embodiment of the present invention.

FIG. 17 is a diagram of a smoothed and processed image of an object, according to one embodiment. Vertex adjacency lists are built and face and vertex normals are computed. Then, one embodiment uses a Laplacian algorithm to smooth some constraints. As a result, the sides of the object are rounded off, noise removed, and areas where the point sheets do not line up perfectly are cleaned up.

Depending on the quality of the point cloud, the surface reconstruction can create small "islands" of geometry instead of a single large mesh. One embodiment uses connected component labeling to find islands, compute their volumes, and remove islands that are significantly smaller than the largest island.

For each vertex, one embodiment looks at the dot product between that vertex's normal and the front and back capture view directions. The front view direction may be along the model-space negative Z axis, while the back view direction may depend on the results of the sheet alignment process and not along the positive Z axis. As a result, some vertices may be visible to both the front and back capture views, and some vertices may be visible to neither view. Some vertices may be classified as "front" if their normal is facing the front more than the back and vice versa. This also allows for location of the "seam" vertices (i.e. the vertices that straddle the front and back views of the object).

To create the texture map to apply onto the final mesh, one embodiment places a color image from the front capture at the top of the texture and the color image from the back capture directly under the front capture. Texels from the top part of the texture are then mapped onto the primarily front-facing triangles and vice versa for the primarily back-facing triangles. Vertices may initially be shared between front and back triangles right along the front-back seam, and later, these shared vertices may be duplicated so that to map different parts of the texture to front versus back triangles.

Figure 18:
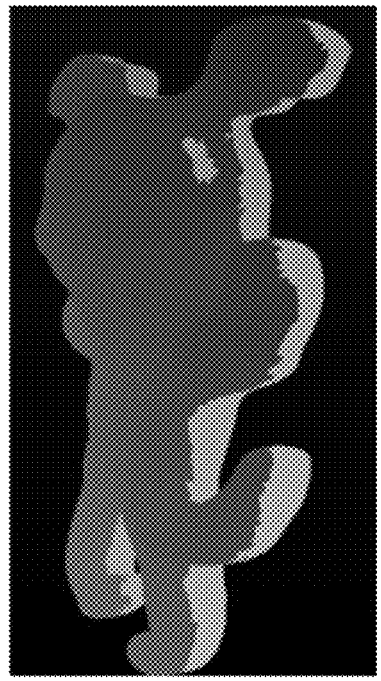
FIG. 18 is a diagram of an image with UV coordinates, in accordance with an embodiment of the present invention.
Figure 19:
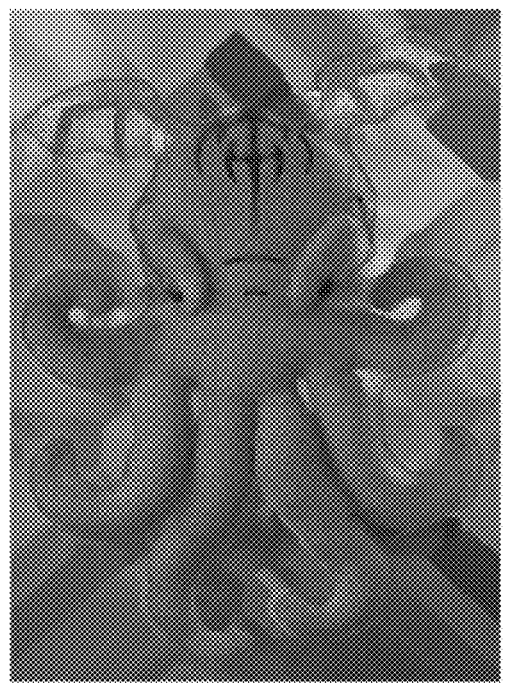
FIG. 19 is a diagram of front-facing triangle edges drawn into a section of a final texture map, in accordance with an embodiment of the present invention.

FIG. 18 illustrates a diagram of an image with UV coordinates, and FIG. 19 illustrates a diagram of front-facing triangle edges drawn into a section of a final texture map, according to one embodiment. To compute UV coordinate, front-facing triangles are mapped to the top part of the texture where placed the front capture color image is placed, and likewise for the bottom. Vertex positions are in the space of the depth camera; whereas, the color images are in the space of the color camera, so after projecting vertices onto the front/back depth images, one embodiment uses the depth-to-color offset table to transform coordinates into the color camera space.

In one embodiment, the mesh is re-centered, mirrored about the up axis, and scaled to enforce a maximum width/height aspect ratio. The captured color and depth images are mirrored compared to the real physical object, so another mirroring is used to reverse this. A skeleton may be optimized and animations may be added for taller rather than wider objects, so the width/height aspect ratio restriction puts a bound on artifacts caused by animating wide objects that do not match a certain skeleton.

In one embodiment, a single skeleton is used for all animations of the object. The skeleton may have bones to give a good range of motions (walking, jumping, crawling, dancing, looking left and right, etc.) without requiring the target object to have much more shape.

To apply skin to the digitized image, the mesh is rescaled and positioned such that skeleton fits inside of it, with the top bone positioned a certain percentage (e.g., approximately 90%) from the top of the object (placing it roughly inside the "head" of the object) and the bottom bone at the bottom extent of the object. Bone indices can then be computed and weights added to the skeleton by finding the closest bones along the up axis to each vertex and weighting to them using a falloff curve. FIGS. 20A-20E are diagrams illustrating weighting added to the different bones of a generated skeletal structure, according to one embodiment. Applying a skeleton to an object is discussed in detail below.

Color and/or depth images are processed to reduce noise and improve quality. Processing is done on the front and back images independently, in one embodiment, and the results are merged into a final texture map, which may require additional processing. After some experimentation and feedback from artists, the following steps were found to be optimal: convert sRGB colors to linear space, apply "grey world" auto-white balance, repair edge artifacts, compute luma and chroma values, apply bilateral filtering, histogram equalization, and sharpening to luma, apply median filtering to chroma, convert back to sRGB, and finally, extend the edges of the colors outwards into the de-segmented regions of the image. Other steps may be added and some of the above deleted in different embodiments.

FIGS. 21A and 21B show images before and after luma/chroma processing, according to one embodiment. Processing luma/chroma independently allows for filtering chroma much more strongly while preserving details in the luma image, which is good for de-noising the image. Histogram equalization may be applied very lightly to compensate for poorly exposed images.

FIGS. 22A and 22B show source and output images after edges are filtered, according to one embodiment. In one embodiment, an "edge repair filter" attempts to replace colors at the edges of the target object that are actually from the background and not the object itself. Bad colors may creep in due to the relatively low resolution and high noise of the depth image and imperfect depth-to-color registration. The edge repair filter operates on a "disputed region" of pixels directly around the object edge. Using the assumption that pixels interior to the disputed region are definitely part of the target object and pixels further exterior are part of the background, a "background likelihood" value is computed per disputed region pixel and used to blend high-likelihood-background pixels towards interior colors.

FIGS. 23A and 23B show images where the edge repair filter finds background colors and which and target colors, according to one embodiment. The targeted colors are extrapolated into a disputed region from the outside.

Figure 25:
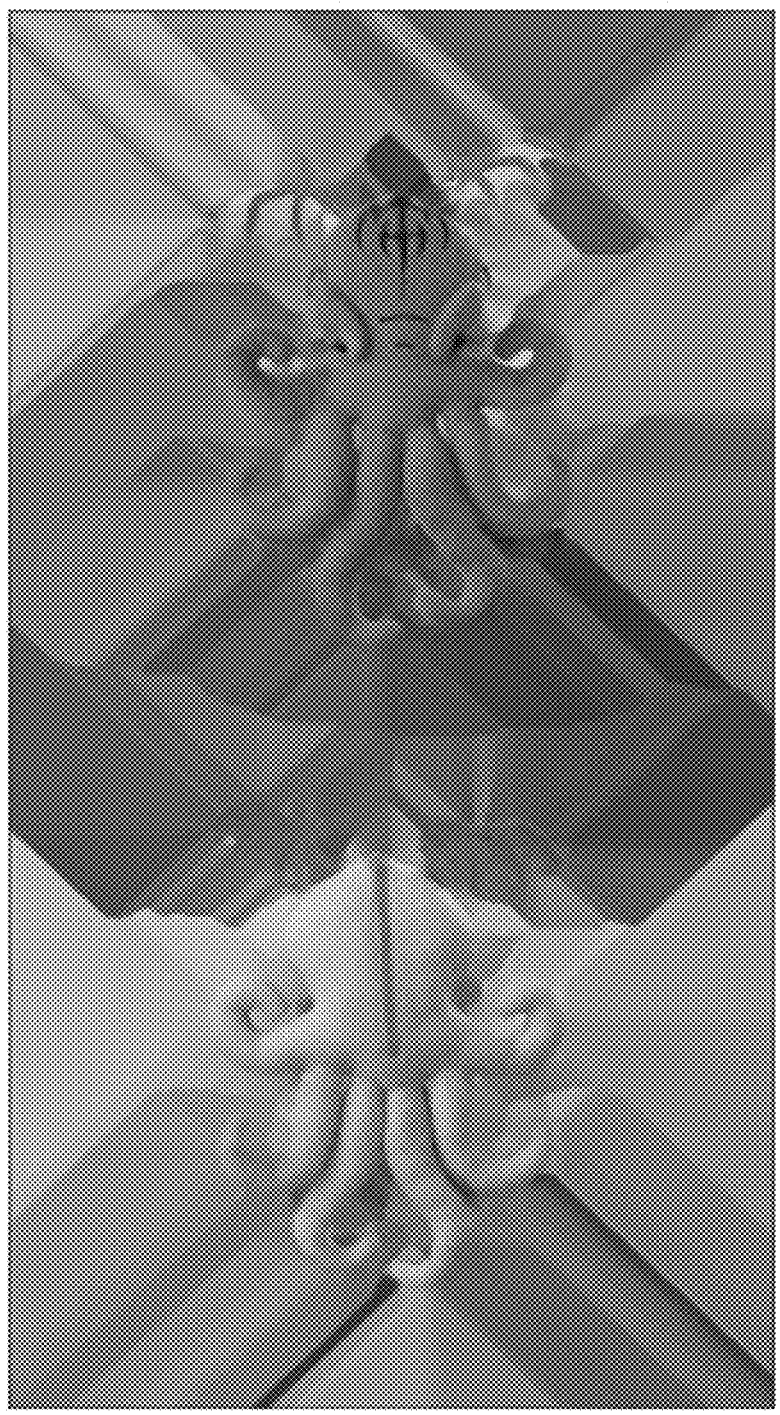
FIG. 25 is a diagram of a final composite texture map, according to one embodiment.

FIGS. 24A and 24B are images showing distance from an edge to a disputed region and calculated background likelihood values, according to one embodiment. Furthermore, FIG. 25 shows a final composite texture map of the image with texturing over tope of a non-finalized image, according to one embodiment.

Seams resulting from placing front and back images together may need to be repaired. The last bit of mesh processing is used to improve the appearance of the object near the front-back seam and in regions that were invisible to the color camera during capturing. First, a mask value per vertex is computed that represents how "bad" the texture color will be at that vertex. This value is the product of distance to the seam (where the front and back images touch but do not generally line up well) and how back-facing a vertex is to any of the captured images (where texture colors break down due to the surface facing away from the camera views and also from poor texel density). These values may be stored in a vertex color alpha channel. Next, a blurred version of the surface color is computed and stored into the vertex color RGB channels. These colors are fairly good in quality (although low in detail). The negative artifacts needing repair are relatively localized and of a higher frequency, where-as the blurring gives more global, low-frequency colors.

Figures 26A, 26B:
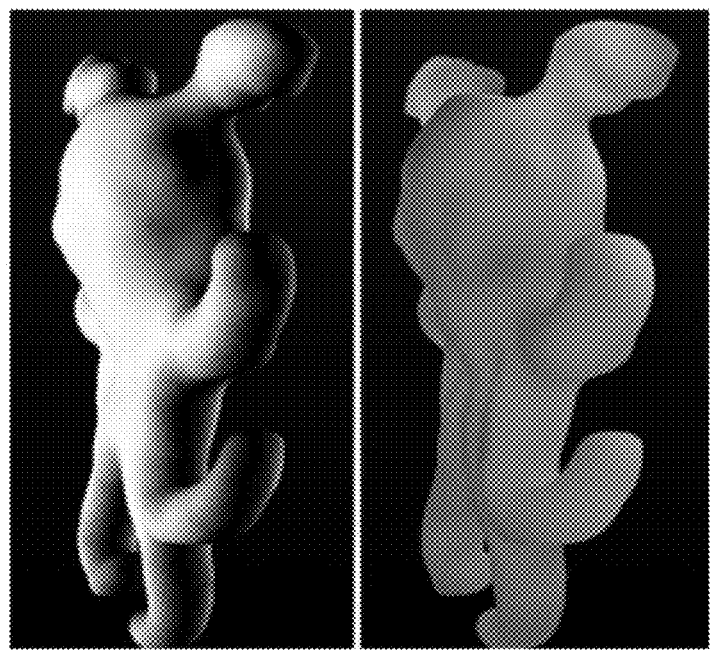
FIGS. 26A and 26B is a diagram of masked values and heavily blurred vertex colors, in accordance with an embodiment of the present invention.
Figures 27A, 27B:
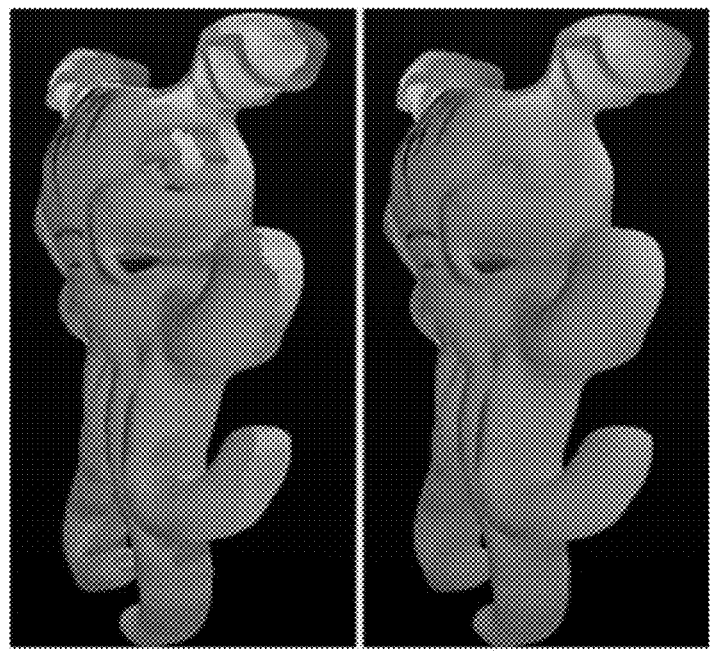
FIGS. 27A and 27B is a diagram of different meshes with texture only and texture with vertex color blending by mask value, in accordance with an embodiment of the present invention.

FIGS. 26A and 26B show masked values and heavily blurred vertex colors, according to one embodiment. At run-time, mask value is used to blend between the source texture and the blurred vertex color, in one embodiment. FIGS. 27A and 27B show different meshes with texture only (27A) and texture with vertex color blending by mask value (27B), according to one embodiment.

Figure 28:
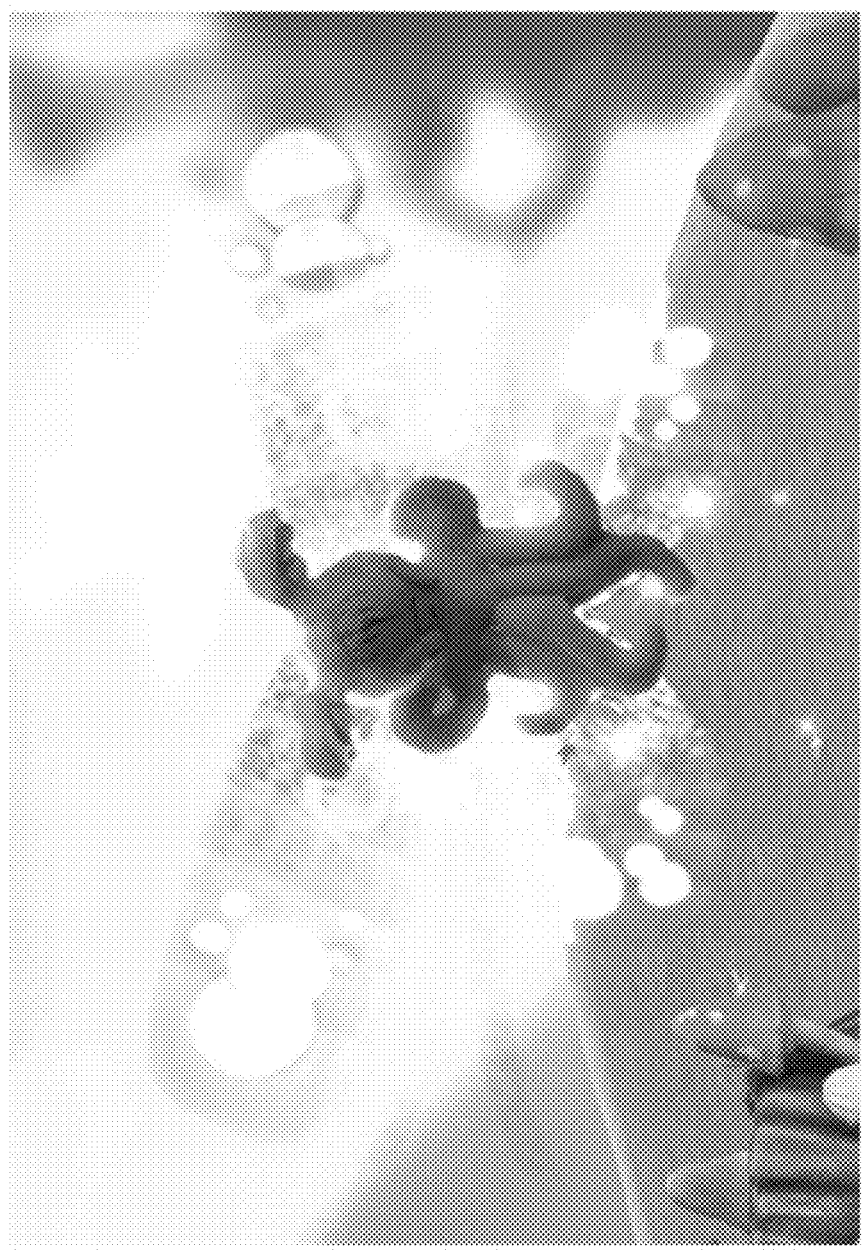
FIG. 28 is a diagram of a final rendering of the digitized object, in accordance with an embodiment of the present invention.

FIG. 28 shows a final rendering of the digitized object, according to one embodiment. In one embodiment, once the final mesh and texture are complete, an Unreal Engine 3 mesh is created and rendered with environment and rim lighting, self-shadowing, and animation. The GOE app also allows the user to avateer the object by mapping the Nui skeleton onto skeleton.

Returning to FIG. 2, the receiving component 231 may be further configured to receive user skeleton information. User skeleton information, as used herein, refers generally to data that identifies a skeleton of the user. In particular, joint angles, joint positions, etc. are included in user skeleton information. In an embodiment, the receiving component 231 may take the form of a camera that is configured to receive objects and user skeleton information. In an additional embodiment, the camera is a camera of a gaming system.

The identifying component 232 may be configured to, among other things, identify an object in a virtual environment (e.g., a digitized object that has been received by the receiving component 231), a user skeleton, an object skeleton, and the like. An object skeleton, as used herein, refers generally to a skeleton to impose on the object in the virtual environment. In an embodiment, a single system-defined template object skeleton is used to control an object in the virtual environment. In alternative embodiments, a plurality of system-defined templates may be available to impose on an object in the virtual environment. In additional embodiments, object skeletons may be created in real-time based on a user's demonstration of motion, as described in more detail below.

Initially, once the object is received by the system 200, the identifying component 232 may identify an object skeleton to associate with the object. Assuming that a single system-defined template object skeleton is available to associate with the object, the identifying component 232 may identify the single system-defined template object skeleton to associate with the object.

Alternatively, if a plurality of object skeletons is available, the identifying component 232 may identify one or more properties of the object. The one or more properties of an object may include, but is not limited to, a number of limbs of the object, a shape of the object, a size of the object (e.g., length, width, etc.), and the like. The one or more properties may then be utilized by the identifying component 232 to identify one or more object skeletons of the plurality of object skeletons that correspond with the one or more properties of the object. For instance, if an object is identified as having two limbs, an object skeleton having two limbs is a better match for the object than an object skeleton having four limbs.

In an additional embodiment, the object skeleton may be created in real-time based on degree of freedom of the user. For instance, the user may demonstrate motion to the identifying component 232 by using its limbs. By demonstrating the degree of freedom (i.e., joints) in movement, an object skeleton may be created in real-time based on the joint information of the user.

The identifying component 232 may also be configured to identify a user skeleton of a user. In embodiments, the user is a human user. The user skeleton may be identified using, for example, skeletal tracking technology that is integrated into, for example, a gaming system such as the Microsoft Kinect™ system created by Microsoft Corporation®. The identifying component 232 may identify a user within an image of the system 200. The user may be identified within the image by identifying each pixel of the image and a distance of each pixel from the identifying component 232. For instance, each pixel of a user would be approximately an equal distance from the identifying component 232 but a lamp behind the user would be a different distance from the identifying component 232 than the user. Additionally, a shape of a user may be used to identify a user in an image. Using these techniques, a user may then be separated from the background.

Once the user is identified in the image (i.e., separated from the background), a user skeleton of the user may be identified. The user skeleton may be identified by identifying a pose of the user. A pose of the user, as used herein, refers generally to a position of the user at the time the image of the user is captured. Within the pose of the user, user skeleton information is identified including, but not limited to, joint angles of the pose, joint position of the pose, and the like. The pose of the user, and the user skeleton information therein, may be compared to one or more template poses that are available from, for example, the data store 220. The comparison may compare the joint angles and the joint positions of the user's pose with joint angles and joint positions of the template poses. By comparing this information, a closest match from the template poses may be identified. The closest match may be associated with the user skeleton.

The mapping component 233 may be configured to, among other things, map the object skeleton to the object and the user skeleton to the object. Initially, the object skeleton may be mapped to the object in the virtual environment. As previously described, the object skeleton may be selected from one or more template object skeletons. The mapping component 233 may map the object skeleton to the object by identifying a center of the object skeleton. The mapping component 233 may also identify a center of mass of the object in the virtual environment. The mapping component 233 may then map the center of the object skeleton to the center of mass of the object.

As can be imagined, the object skeleton, as it may be a system-defined template skeleton, may not fit the object (i.e., the object may be larger or smaller than the object skeleton). In an embodiment, the object is resized to fit the object skeleton. Resizing the object to fit the object skeleton may include, but is not limited to, aligning the bottom of the object with the bottom of the object skeleton. In embodiments, the bottom of the object and the bottom of the object skeleton are exactly aligned with one another. Next, the top of the object may be aligned with the top of the object skeleton. The top of the object may be aligned with the object skeleton such that the top of the object skeleton is a predetermined distance below the top of the object. The top of the object skeleton may be aligned a predetermined distance below the top of the object to account for a portion of the object that is assumed to be the object's head. In an embodiment, the predetermined distance is ten percent (10%) below the top of the object. The predetermined distance may be any distance designated by an authorized user.

In an alternative embodiment, the object skeleton is resized to fit the object rather than resizing the object. The object skeleton would, thus, be aligned with the object such that the bottom of the object skeleton and the bottom of the object are aligned. The top of the object skeleton may also be aligned with the top of the object such that the top of the object skeleton is a predetermined distance below the top of the object. In embodiments, the predetermined distance is ten percent (10%) below the top of the object. The predetermined distance may be any distance designated by an authorized user.

Once the mapping component 233 has mapped the object skeleton to the object, the user skeleton may be mapped to the object skeleton. Mapping the user skeleton to the object skeleton may be a one to one mapping (1:1) or may not be 1:1 mapping. A 1:1 mapping indicates the same number of joints in the user skeleton and the object skeleton. In that situation, the joint angles of the user skeleton are mapped to the corresponding joint angles of the object skeleton such that the object skeleton mirrors that of the user skeleton.

At times, however, the mapping will not be a 1:1 mapping; meaning that the object skeleton and the user skeleton have a different number of joints. In this case, it may be desired to exaggerate the motion of some joints and suppress the motion of other joints. Additionally, movements of one joint may be mapped to a different joint in the object skeleton. For example, assume that the object is an elephant. Obviously, a user does not have a trunk and an elephant does not have arms that work the same way as a user's arms. Movement of the arms of a user skeleton may be mapped to, for example, the trunk of the elephant. Thus, the trunk of the elephant will respond according to movement of the user's arms.

Also the mapping does not need to be angle-to-angle. For example, joint position (e.g., how high the user is raising their hands) may be mapped to joint scale in the object skeleton, causing the object to stretch upwards in response to the user raising their hands. In addition, user joint angles may be used to control a more elaborate multi-joint animation, so one user joint position might control multiple object joints in a non-linear fashion.

Once the user skeleton is mapped to the object skeleton, the object in the virtual environment mirrors the real-world user. For example, if the user raises their right arm, the object will respond in kind according to the mapping (e.g., the mapping may be 1:1 causing the object to raise its right arm as well or the mapping may not have been 1:1 causing the object to respond with another motion that has been mapped to the user's right arm movement).

The controlling engine 230 may operate in real-time such that each time the user moves the data is updated. In particular, the user skeleton may be updated every time the user moves. This may also result in re-mapping of the user skeleton to the object skeleton. As this is occurring in real-time, the object remains controlled by the user and will continue to respond to the movements of the user according to the mappings.

The displaying component 234 is configured to display the object. The displayed object will, according to the mappings, respond to the movements of the user.

Figure 29:
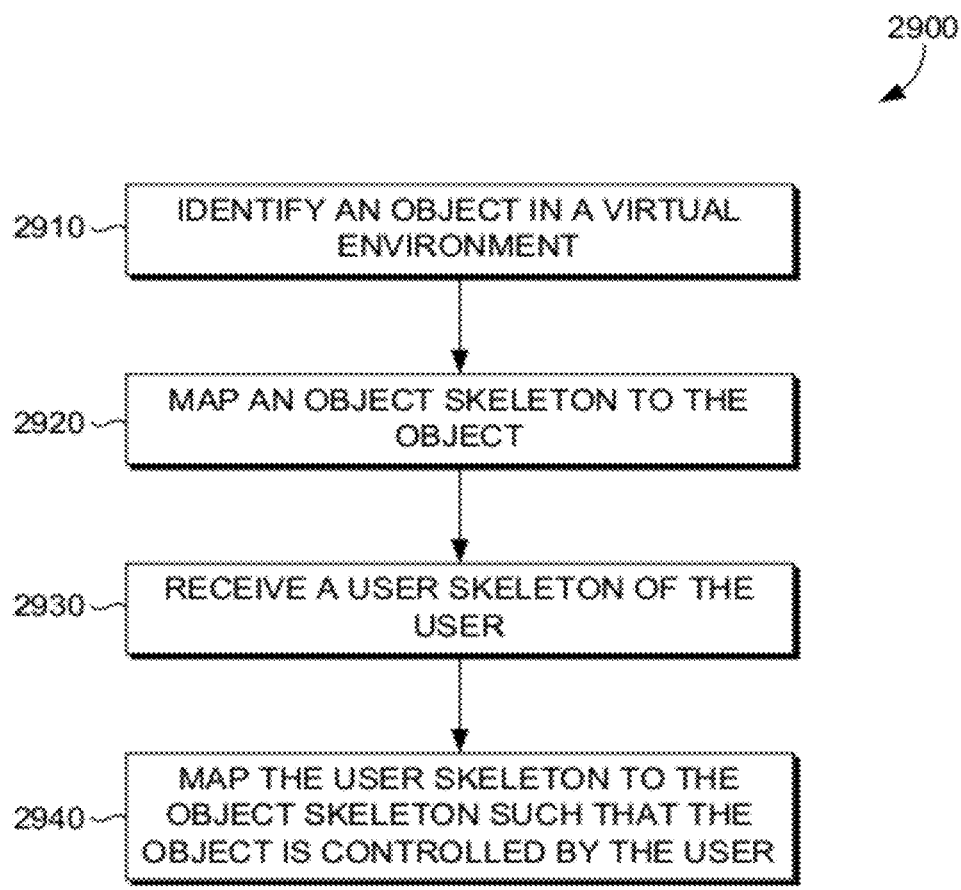
FIG. 29 is a flow diagram showing a method for controlling objects in a virtual environment, in accordance with an embodiment of the present invention.

Referring now to FIG. 29, a flow diagram is provided that illustrates an overall method 2900 for controlling objects in a virtual environment, in accordance with an embodiment of the present invention. Initially, as shown at block 2910, an object is identified in a virtual environment. As previously indicated, the object may be any non-human object received from the real-world into the virtual environment. An object skeleton is mapped to the object at block 2920. The object skeleton may be a system-defined object skeleton template that is resized to fit the object. Alternatively, the object may be resized to fit the object skeleton. At block 2930, a user skeleton of the user is received. The user skeleton of a real-world user is received and skeleton information including a number of joints, joint angles, joint positions, and the like may be identified. At block 2940, the user skeleton is mapped to the object skeleton such that the object is controlled by the user. In particular, the user's movements control the movement of the object.

Figure 30:
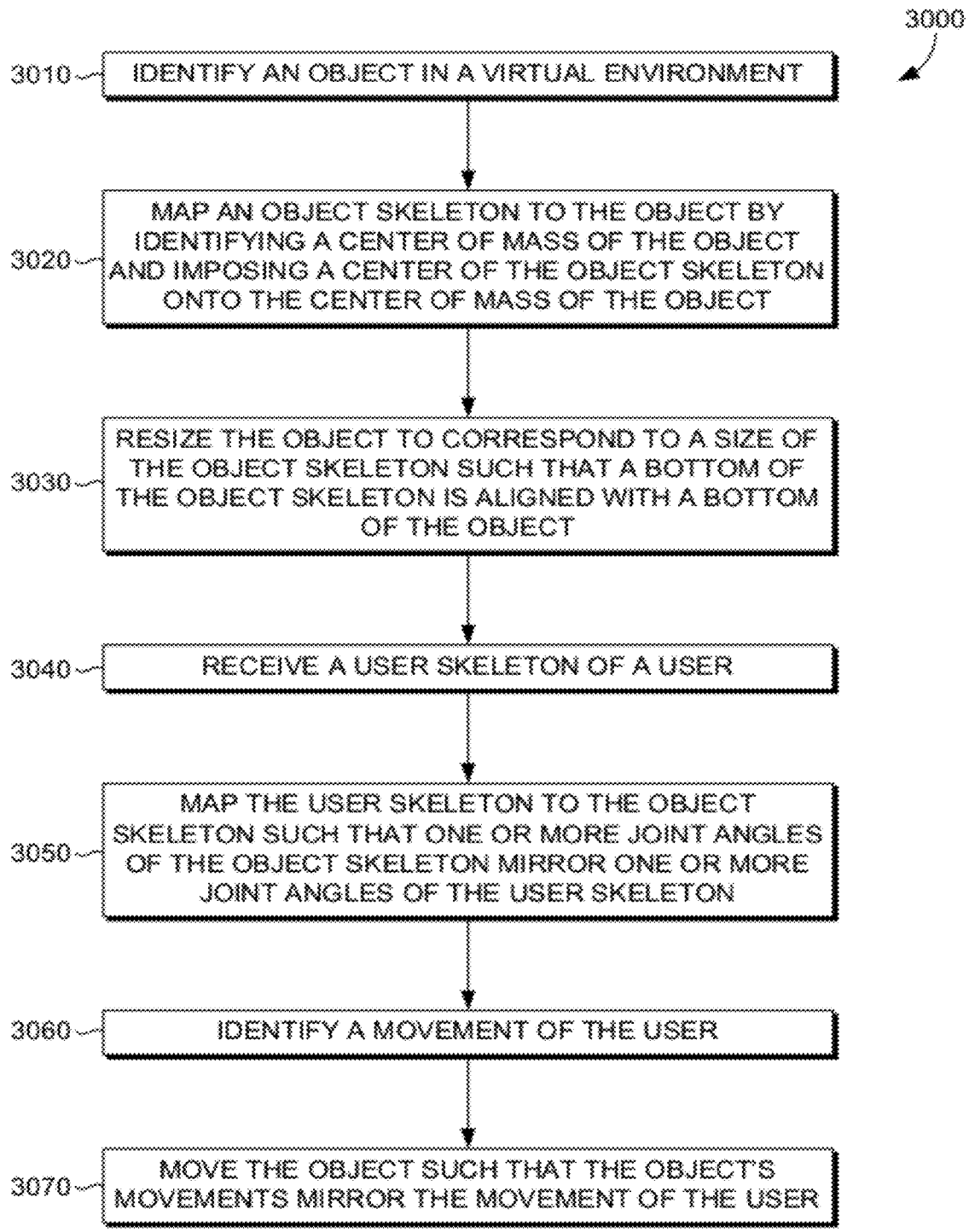
FIG. 30 is a flow diagram showing a method for controlling objects in a virtual environment, in accordance with an embodiment of the present invention.

Referring now to FIG. 30, a flow diagram is provided that illustrates an overall method 3000 for controlling objects in a virtual environment, in accordance with an embodiment of the present invention. Initially, as shown at block 3010, an object is identified in a virtual environment. In embodiments, the object may be a real-world object that has been digitized and received in the virtual environment. At block 3020, an object skeleton is mapped to the object by identifying a center of mass of the object and imposing a center of the object skeleton onto the center of mass of the object. The object and/or the object skeleton may then be resized to fit such that the bottom of the object skeleton is aligned with the bottom of the object at block 3030. A user skeleton of a user is received at block 3040. The user skeleton is mapped to the object skeleton such that one or more joint angles of the object skeleton mirror one or more joint angles of the user skeleton at block 3050. At block 3060, a movement of the user is identified and, at block 3070, the object is moved such that the object's movements mirror the movement of the user.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage hardware devices storing computer-useable instructions that, when used by one or more computing devices, cause the one or more computing devices to perform a method, the method comprising:
identifying an object in a virtual environment;
identifying an object skeleton to associate with the object, the object skeleton being identified based on one or more properties of the object;
mapping the object skeleton to the object, the object skeleton being a pre-defined template having one or more joint angles, a joint angle representing a degree of an angle between one or more joints;
receiving a user skeleton, the user skeleton being an image of a skeleton of a user having one or more joint angles; and
mapping the user skeleton to the object skeleton such that the object is controlled by the user, the mapping of the user skeleton to the object skeleton comprising:
mapping a joint position of the user skeleton to a joint scale of the object skeleton, the object being stretched in response to movement of the joint position, and
mapping at least one of the one or more joint angles of the user skeleton to control a multi-angle animation, the joint position controlling multiple joints of the object in a non-linear fashion.

2. The one or more computer storage hardware devices of claim 1, wherein the object is a non-human object.

3. The one or more computer storage hardware devices of claim 1, wherein the mapping of the object skeleton to the object comprises:
identifying a center of the object skeleton;
identifying a center of mass of the object; and
imposing the center of the object skeleton onto the center of mass of the object.

4. The one or more computer storage hardware devices of claim 3, further comprising:
resizing the object to fit the object skeleton.

5. The one or more computer storage hardware devices of claim 4, wherein resizing the object to fit the object skeleton comprises:
aligning a bottom of the object with a bottom of the object skeleton; and
aligning a top of the object with a top of the object skeleton such that the top of the object skeleton is a predetermined distance below the top of the object.

6. The one or more computer storage hardware devices of claim 5, wherein the predetermined distance below the top of the object is ten percent (10%) below the top of the object.

7. The one or more computer storage hardware devices of claim 1, wherein the object is a real-world object that has been digitized and received in the virtual environment.

8. The one or more computer storage hardware devices of claim 1, wherein the object is controlled by the user such that the object's movements mirror those of the user.

9. A system for controlling objects in a virtual environment, comprising:
a computing device associated with one or more processors and one or more computer-readable storage media;
a data store coupled with the computing device; and
a controlling engine that
identifies an object;
identifies one or more skeletons including a user skeleton and an object skeleton, each skeleton having one or more joint angles, a joint angle representing a degree of an angle between one or more joints, the object skeleton being identified based on one or more properties of the object;
maps the one or more joint angles of the user skeleton to the corresponding one or more joint angles of the object skeleton;
maps a joint position of the user skeleton to a joint scale of the object skeleton, the object being stretched in response to movement of the joint position, and uses the one or more joint angles of the user skeleton to control a multi-angle animation so that the joint position controls multiple joints of the object in a non-linear fashion; and
manages the object skeleton such that the object is manipulated to mirror movements of the user skeleton.

10. The system of claim 9, wherein the object is a non-human object.

11. The system of claim 9, wherein the controlling engine identifies the user skeleton from a plurality of template poses by comparing a pose of a user with the plurality of template poses and identifying one of the plurality of template poses that corresponds with the pose of the user.

12. The system of claim 9, wherein the controlling engine is further configured to map the object skeleton to the object.

13. The system of claim 9, wherein the controlling engine operates in real-time.

14. The system of claim 9, wherein the object skeleton is identified from a plurality of template object skeletons by comparing properties of the object with the plurality of template object skeletons.

15. One or more computer storage hardware devices storing computer-useable instructions that, when used by one or more computing devices, cause the one or more computing devices to perform a method, the method comprising:
identifying an object in a virtual environment, the object being a real-world object that has been digitized into a virtual form;
creating an object skeleton to associate with the object in real-time based on degree of freedom of a user;
mapping an object skeleton to the object by identifying a center of mass of the object and imposing a center of the object skeleton onto the center of mass of the object, the object skeleton being a pre-defined template;
resizing the object to correspond to a size of the object skeleton such that a bottom of the object skeleton is aligned with a bottom of the object;
receiving a user skeleton, the user skeleton being a skeleton of the user, the user skeleton being identified by a pose of the user, user skeleton information comprising one or more joint angles of the pose;
mapping the user skeleton to the object skeleton such that one or more joint angles of the object skeleton mirror at least one of the one or more joint angles of the pose, a joint angle representing a degree of an angle between one or more joints, the object being stretched in response to movement of a joint position of the user skeleton pose, and the one or more joint angles of the user skeleton controlling a multi-angle animation, the joint position controlling multiple joints of the object in a non-linear fashion;
identifying a movement of the user; and
in response to identifying the movement of the user, moving the object such that the object's movements mirror the movement of the user.

16. The one or more computer storage hardware devices of claim 15, wherein the mapping is performed in real-time.

17. The one or more computer storage hardware devices of claim 15, wherein the user skeleton is mapped to the object each time a user movement is detected.

18. The one or more computer storage hardware devices of claim 15, wherein receiving the user skeleton comprises:
identifying the user within an image;
comparing a pose of the user with a plurality of template poses;
identifying a template pose of the plurality of template poses that corresponds to the pose of the user; and
identifying one or more joint angles of the template pose.

19. The one or more computer storage hardware devices of claim 18, wherein the mapping of the user skeleton to the object skeleton includes associating the one or more joint angles of the template pose with the object skeleton such that the object skeleton's one or more joint angles mirror the one or more joint angles of the template pose representing the user.

20. The one or more computer storage hardware devices of claim 15, wherein the object is an inanimate object.

* * * * *